(12) United States Patent
Hodoya et al.

(10) Patent No.: US 7,543,865 B2
(45) Date of Patent: Jun. 9, 2009

(54) BUMPER DEVICE FOR VEHICLE

(75) Inventors: Kohei Hodoya, Toyota (JP); Shinichi Haneda, Anjo (JP); Jun Shobo, Himi (JP); Kiyoichi Kita, Takaoka (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 0 days.

(21) Appl. No.: 11/727,528

(22) Filed: Mar. 27, 2007

(65) Prior Publication Data
US 2007/0228747 A1    Oct. 4, 2007

(30) Foreign Application Priority Data
Mar. 29, 2006 (JP) .............................. 2006-092145

(51) Int. Cl.
*B60R 19/04* (2006.01)
(52) U.S. Cl. ..................................... 293/102
(58) Field of Classification Search ............. 293/102, 293/132, 133
See application file for complete search history.

(56) References Cited

U.S. PATENT DOCUMENTS

| | | | | |
|---|---|---|---|---|
| 1,614,087 A * | 1/1927 | Shaw | ........................... | 293/102 |
| 3,861,110 A * | 1/1975 | Bartlett | ..................... | 52/718.05 |
| 3,949,697 A * | 4/1976 | Ueda | ........................... | 114/219 |
| 4,116,480 A * | 9/1978 | Crestetto | ..................... | 293/102 |
| 4,671,550 A * | 6/1987 | Molnar | ........................ | 293/120 |
| 4,714,287 A * | 12/1987 | Merkle | ........................ | 293/102 |
| 5,080,410 A * | 1/1992 | Stewart et al. | ............... | 293/102 |
| 5,219,197 A * | 6/1993 | Rich et al. | .................... | 293/120 |
| 5,340,178 A * | 8/1994 | Stewart et al. | ............... | 293/122 |
| 6,000,738 A * | 12/1999 | Stewart et al. | ............... | 293/102 |
| 6,227,582 B1 * | 5/2001 | Ichien | ........................ | 293/132 |
| 6,343,820 B1 * | 2/2002 | Pedersen | ..................... | 293/102 |
| 6,354,641 B1 * | 3/2002 | Schroeder et al. | ........... | 293/155 |
| 6,712,411 B2 * | 3/2004 | Gotanda et al. | ............. | 293/155 |
| 6,733,055 B2 * | 5/2004 | Iino | ........................... | 293/142 |
| 6,808,215 B2 * | 10/2004 | Sakuma et al. | ............... | 293/102 |
| 6,893,062 B2 * | 5/2005 | Amano et al. | ................ | 293/102 |
| 6,896,317 B2 * | 5/2005 | Liebhard et al. | ....... | 296/187.03 |
| 6,908,130 B2 * | 6/2005 | Reutlinger et al. | .......... | 293/155 |
| 6,932,398 B2 * | 8/2005 | Frank | .......................... | 293/155 |
| 7,073,831 B2 * | 7/2006 | Evans | .......................... | 293/155 |
| 7,163,241 B2 * | 1/2007 | Liu et al. | ..................... | 293/102 |
| 7,210,719 B2 * | 5/2007 | Honda et al. | ................. | 293/155 |
| 2005/0082850 A1 * | 4/2005 | Reierson et al. | ............. | 293/102 |
| 2005/0269823 A1 * | 12/2005 | DeVoursney et al. | ........ | 293/102 |

FOREIGN PATENT DOCUMENTS

| JP | 52037338 A | * | 3/1977 |
|---|---|---|---|
| JP | 59018049 A | * | 1/1984 |
| JP | 59086708 A | * | 5/1984 |
| JP | 2001-58550 | | 3/2001 |

* cited by examiner

*Primary Examiner*—Glenn Dayoan
*Assistant Examiner*—Paul A Chenevert
(74) *Attorney, Agent, or Firm*—Finnegan, Henderson, Farabow, Garrett & Dunner, LLP

(57) ABSTRACT

A bumper device for a vehicle includes a bumper reinforcement provided along a width direction of the vehicle. The bumper reinforcement is formed with a hole at an impact surface thereof and is provided with at least four ridge lines extending along the width direction of the vehicle at a side of the impact surface.

4 Claims, 3 Drawing Sheets

BUMPER DEVICE FOR VEHICLE

This application is based on and claims priority under 35 U.S.C. § 119 to Japanese Patent Application 2006-092145, filed on Mar. 29, 2006, the entire content of which is incorporated herein by reference.

FIELD OF THE INVENTION

The present invention relates to a bumper device for a vehicle.

BACKGROUND

Generally, a bumper reinforcement equipped in a bumper device for a vehicle is mounted to an impact absorber such as a crash box, or the like, provided at an end portion of a front side member or a rear side member of a vehicle frame. For example, JP2001-58550A discloses a bumper device for a vehicle including a bumper reinforcement having a working hole at an impact surface thereof. The working hole is used when the bumper reinforcement is mounted to the impact absorber.

In a condition where the bumper reinforcement is mounted to a heavy vehicle, a higher degree of section stiffness is designed. However, if the section stiffness is increased, stress may easily be concentrated in the vicinity of the working hole formed at the impact surface in a condition where the vehicle collides against a collision object at an angle. Further, a rupture may occur from the working hole.

For example, the Insurance Institute for Highway Safety (i.e., IIHS) executes a crash safety performance test in which the vehicle collides against a 30 degree offset barrier at 5 mph. Also in this test, there is a possibility of occurring the rupture at the bumper reinforcement. If the rupture occurs, energy absorption at the bumper reinforcement may not sufficiently be performed. Further, a stroke at a vehicle body side for the impact absorption may be increased and a repair cost may thereby be increased.

The present invention has been made in view of the above circumstances, and provides a bumper device for a vehicle, which restrains a generation of rupture from a hole formed on an impact surface of a bumper reinforcement at the time of a vehicle crash.

SUMMARY OF THE INVENTION

According to an aspect of the present invention, a bumper device for a vehicle includes a bumper reinforcement provided along a width direction of the vehicle. The bumper reinforcement is formed with a hole at an impact surface thereof and is provided with at least four ridge lines extending along the width direction of the vehicle at a side of the impact surface.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Hereinafter, a bumper device for a vehicle according to an embodiment of the present invention will be described with reference to the drawings. In the following description, an explanation is made without distinguishing between a front side and a rear side of the vehicle. If the bumper device is equipped at the front side of the vehicle, a vehicle outer side represents the front side of the vehicle and a vehicle inner side represents the rear side of the vehicle. Further, if the bumper device is equipped at the rear side of the vehicle, the vehicle outer side represents the rear side of the vehicle and the vehicle inner side represents the front side of the vehicle.

Figure 1:
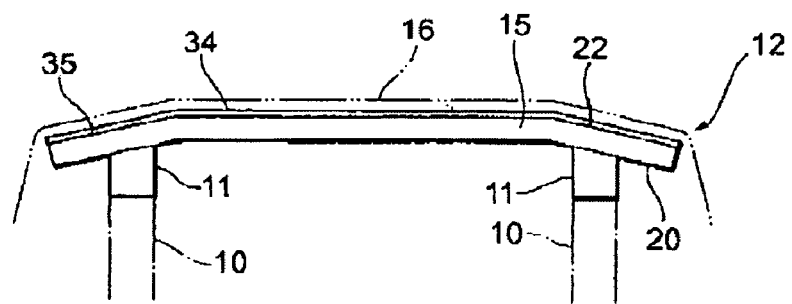
FIG. 1 is a plan view illustrating a bumper device for a vehicle according to an embodiment of the present invention.

As illustrated in FIG. 1, the vehicle includes a pair of side member 10 at an end portion of a vehicle body in a back and forth direction thereof. The side member 10 serving as a pair of frame member is respectively extended in a back and forth direction of the vehicle body. A crash box 11 serving as an impact absorber is respectively provided at an end portion of each side member 10. A bumper device 12 includes a bumper reinforcement 15 and a bumper cover 16. The bumper reinforcement 15 provided along a width direction of the vehicle is mounted to the crash box 11. The bumper cover 16 made of resin forms a design surface by covering the vehicle outer side of the bumper reinforcement 15.

Figure 2:
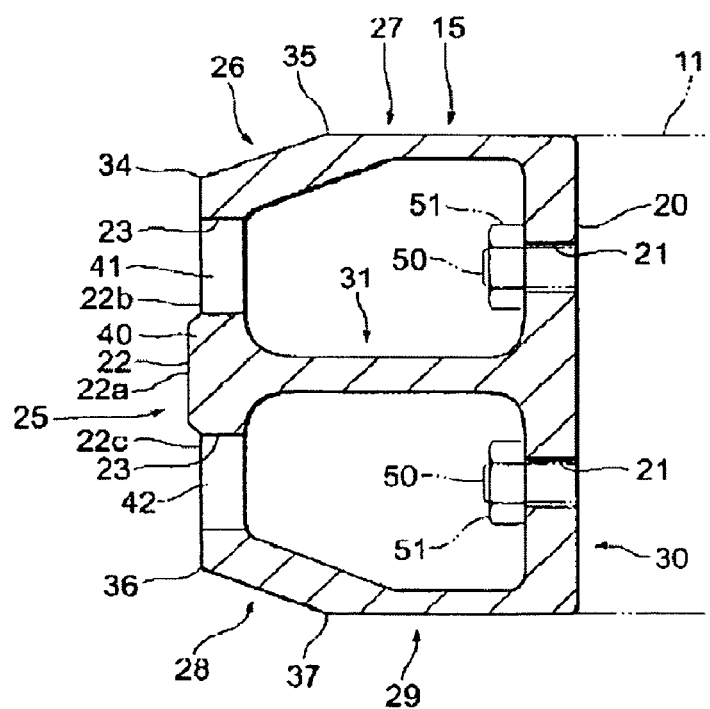
FIG. 2 is a sectional view illustrating the bumper device for a vehicle according to the embodiment of the present invention.

The bumper reinforcement 15 made of aluminum is integrally formed by an extrusion molding. As shown in FIG. 2, the bumper reinforcement 15 is properly bended and provided with a mounting hole 21 at a mounting surface 20 and a working hole 23 at an impact surface 22, the working hole 23 being used when the bumper reinforcement 15 is mounted to the crash box 11. The mounting surface 20 is located at a side to be mounted to the crash box 11 and the impact surface 22 is faced to the mounting surface 20. The bumper reinforcement 15 includes a mirror symmetrical shape in an up and down direction thereof.

More specifically, the bumper reinforcement 15 includes an outer end plate member 25, an upward sloping plate member 26, an upper plate member 27, a downward sloping plate member 28, a lower plate member 29, a mounting plate member 30, and a reinforcing plate member 31. The outer end plate member 25 is extended substantially perpendicular to the back and forth direction of the vehicle and is extended in the width direction of the vehicle at an end portion of the vehicle outer side. The upward sloping plate member 26 is upwardly extended from an upper end portion of the outer end plate member 25 toward the vehicle inner side. The upper plate member 27 is substantially horizontally extended from an upper end portion of the upward sloping plate member 26 toward the vehicle inner side. The downward sloping plate member 28 is downwardly extended from a lower end portion of the outer end plate member 25 toward the vehicle inner side. The lower plate member 29 is substantially horizontally extended from a lower end portion of the downward sloping plate member 28 toward the vehicle inner side. The mounting plate member 30 is extended substantially perpendicular to the back and forth direction of the vehicle and connects an inner end portion of the upper plate member 27 at the vehicle inner side and an inner end portion of the lower plate member 29 at the vehicle inner side. The reinforcing plate member 31 is extended parallel to the upper plate member 27 and the lower plate member 29 and connects the outer end plate member 25 and the mounting plate member 30.

An outer surface of the mounting plate member 30 is the above described mounting surface 20 which is located at the side to be mounted to the crash box 11. Further, an outer surface of the outer end plate member 25, the upward sloping plate member 26, and the downward sloping plate member 28 is the above described impact surface 22 which is located at an impact side against a collision object at the time of a vehicle crash.

An upper intermediate ridge line 34 is formed along a boundary between the outer end plate member 25 and the upward sloping plate member 26 at the impact surface 22. The upper intermediate ridge line 34 is protruded toward the vehicle outer side and extended along the width direction of the vehicle. An upper end ridge line 35 is formed along a boundary between the upward sloping plate member 26 and the upper plate member 27 at the impact surface 22. The upper end ridge line 35 is protruded toward the vehicle outer side and extended along the width direction of the vehicle. A lower intermediate ridge line 36 is formed along a boundary between the outer end plate member 25 and the downward sloping plate member 28 at the impact surface 22. The lower intermediate ridge line 36 is protruded toward the vehicle outer side and extended in the width direction of the vehicle. A lower end ridge line 37 is provided along a boundary between the downward sloping plate member 28 and the lower plate member 29 at the impact surface 22. The lower end ridge line 37 is protruded toward the vehicle outer side and extended along the width direction of the vehicle.

The outer end plate member 25 makes an obtuse angle with the upward sloping plate member 26 via the upper intermediate ridge line 34 located at a boundary position therebetween. The outer end plate member 25 makes an obtuse angle with the downward sloping plate member 28 via the lower intermediate ridge line 36 located at a boundary position therebetween. The upward sloping plate member 26 makes an obtuse angle with the upper plate member 27 via the upper end ridge line 35 at a boundary position therebetween. The downward sloping plate member 28 makes an obtuse angle with the lower plate member 29 via the lower end ridge line 37 located at a boundary position therebetween.

A thickness of the outer end plate member 25 within an intermediate range portion 40 located at an intermediate position in the up and down direction thereof is wider than within an upper range portion 41 and a lower range portion 42. The upper range portion 41 is located at an upper side of the intermediate range portion 40 and the lower range portion 42 is located at a lower side of the intermediate range portion 40 in the up and down direction of the bumper reinforcement 15. Therefore, the impact surface 22 includes a stepped shape. More specifically, an intermediate surface portion 22a formed within the intermediate range portion 40 is located exterior to an upper surface portion 22b formed within the upper range portion 41 and a lower surface portion 22c formed within the lower range portion 42 in the back and forth direction of the vehicle. Further, a thickness of the upward sloping plate member 26 and the downward sloping plate member 28 is wider than the outer end plate member 25 within the upper range portion 41 and the lower range portion 42.

Each working hole 23 is respectively formed at a part of the outer end plate member 25, the upward sloping plate member 26, and the downward sloping plate member 28 located within the upper range portion 41 and the lower range portion 42. The outer end plate member 25, the upward sloping plate member 26, and the downward sloping plate member 28 form the impact surface 22. In consequence, the thickness of the intermediate range portion 40 located exterior to the hole 23 at the impact surface 22, the upward sloping plate member 26, and the downward sloping plate member 28 is wider than the upper range portion 41 and the lower range portion 42 of the hole 23.

In a condition where a thickness of an impact surface of a known bumper reinforcement is assumed to be t, the thickness of the intermediate range portion 40, the upward sloping plate member 26, and the downward sloping plate member 28 of the bumper reinforcement according to the embodiment of the present invention is more than, or equal to, 1.2 t and the thickness of the upper range portion 41 and the lower range portion 42 of the bumper reinforcement according to the embodiment of the present invention is more than, or equal to, 0.8 t.

The mounting plate member 30 includes a plurality of mounting holes 21 through which bolts 50 protruded from the crash box 11 are inserted.

The bolt 50 protruded from the crash box 11 is inserted through the mounting hole 21 so that the mounting plate member 30 is in contact with the crash box 11. In this state, the bolt 50 is fastened by a nut 51 by means of a tool (not shown) through the working hole 23 at the impact surface 22. Accordingly, the bumper reinforcement 15 is mounted to the crash box 11.

According to the embodiment of the present invention, the bumper reinforcement 15 is formed with the upper intermediate ridge line 34, the lower intermediate ridge line 36, the upper end ridge line 35, and the lower end ridge line 37 at a side of the impact surface 22 along the width direction of the vehicle. Therefore, a load at the time of the car crash can smoothly be transmitted to the upper plate member 27, the lower plate member 29, or the like, and a stress concentration in the vicinity of the hole 23 can be restrained.

Accordingly, because a generation of a rupture from the hole 23 formed at the impact surface 22 of the bumper reinforcement 15 at the time of the car crash can be restrained, an energy absorption in the bumper reinforcement 15 can sufficiently be performed and an energy absorption at a vehicle body side can be restrained. In consequence, a repair cost can be reduced.

Figure 3:
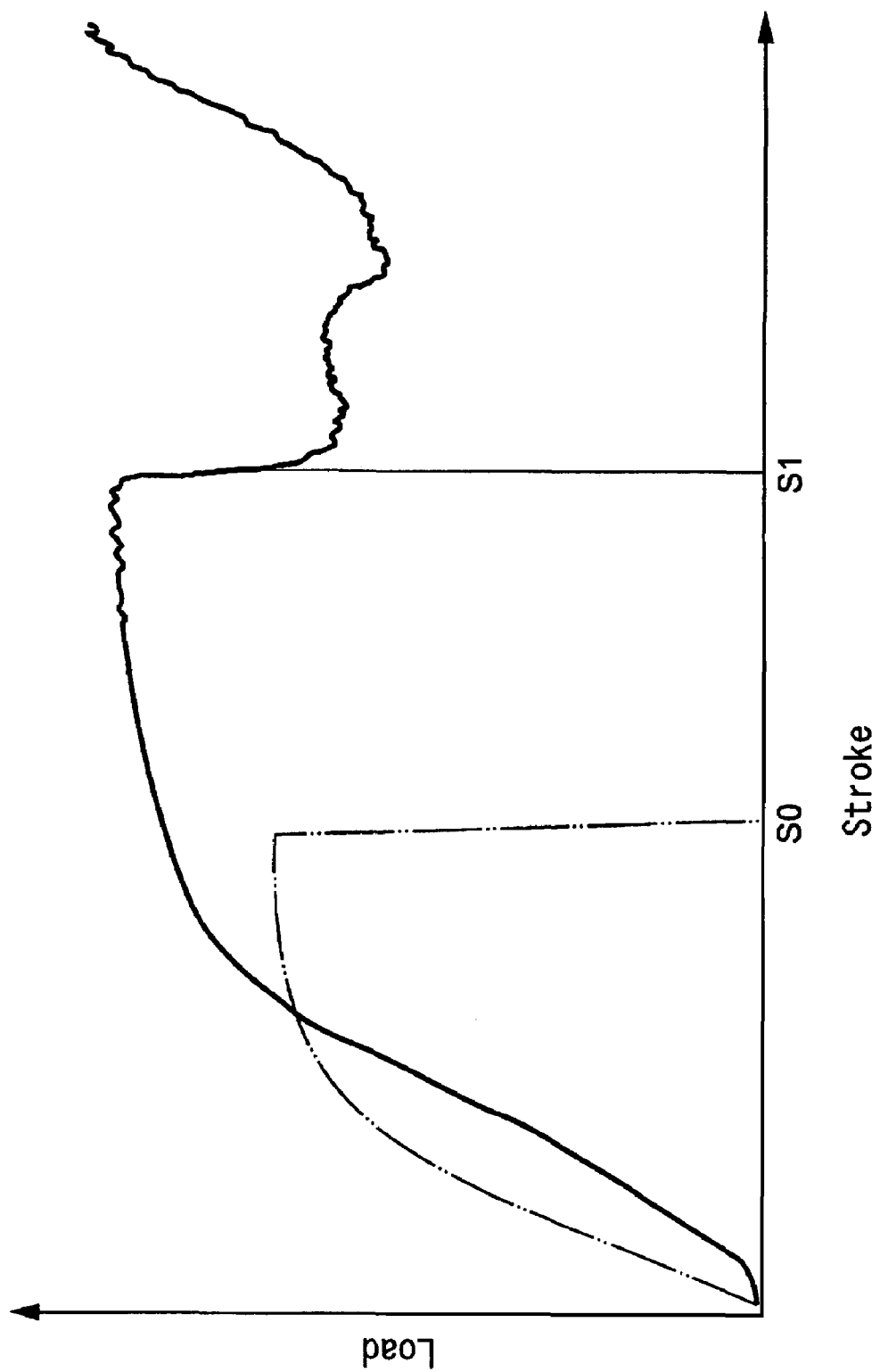
FIG. 3 is a graph indicating a characteristic line comparing an impact absorption performance of the bumper device for a vehicle according to the embodiment of the present invention with an impact absorption performance of a related bumper device.

With reference to a characteristic line in FIG. 3 which shows a relation between a stroke and a load, according to a known bumper reinforcement (indicated by a chain double-dashed line) having a substantially certain thickness at the impact surface 22, an impact absorption energy represented by an area enclosed by the characteristic line (chain double-dashed line) is small because the rupture occurs at a stroke S0. However, with the configuration of the bumper reinforcement 15 (indicated by a solid line) according to the embodiment of the present invention, even when a sectional area (i.e., a weight) thereof is identical to that of the known bumper reinforcement, an impact absorption energy represented by an area enclosed by the characteristic line (solid line) is large because the rupture does not occur. Further, according to the embodiment of the present invention, an impact absorption energy by buckling of the crash box 11 after a stroke S1 can optimally be obtained.

According to the embodiment of the present invention, because the thickness of the intermediate range portion 40 located exterior to the hole 23 at the impact surface 22, the upward sloping plate member 26, and the downward sloping plate member 28 is wider than the upper range portion 41 and the lower range portion 42 of the hole 23, the generation of the rupture from the hole 23 at the time of the car crash can further be restrained.

Figure 4:
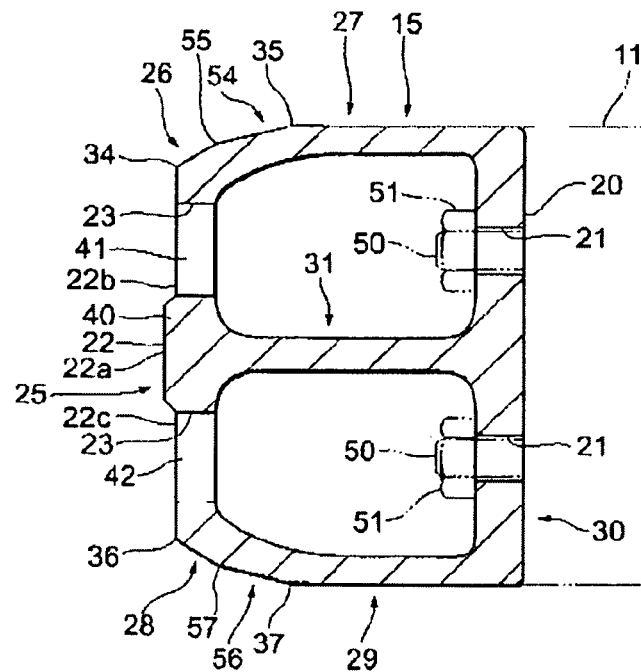
FIG. 4 is a sectional side view illustrating a variation of a bumper device for a vehicle.

The present invention is applicable as long as the bumper reinforcement 15 includes more than, or equal to, four ridge lines at the impact surface 22 in the width direction of the vehicle. Alternatively, or in addition, six ridge lines may be provided as shown in FIG. 4. More specifically, an upper end sloping plate member 54 may be provided between the upward sloping plate member 26 and the upper plate member 27, a ridge line 55 may be provided between the upper end ridge line 35 and the upper intermediate ridge line 34, a lower end sloping plate member 56 may be provided between the downward sloping plate member 28 and the lower plate member 29, and a ridge line 57 may be provided between the lower end ridge line 37 and the lower intermediate ridge line 36. The upper end sloping plate member 54 is upwardly extended from the upward sloping plate member 26 toward the vehicle inner side and makes a smaller angle with a horizontal line relative to the upward sloping plate member 26. The lower end sloping plate member 56 is downwardly extended from the downward sloping plate member 28 toward the vehicle inner side and makes a smaller angle with a horizontal line relative to the downward sloping plate member 28.

Figure 5:
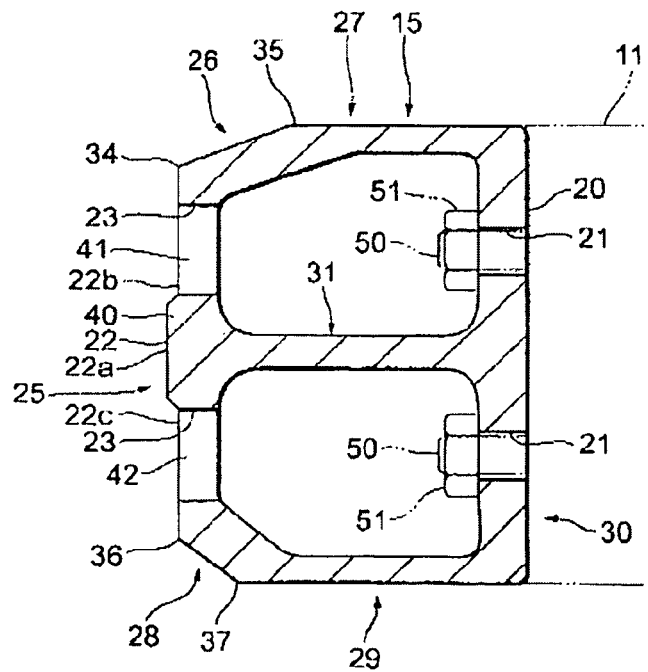
FIG. 5 is a sectional side view illustrating another variation of a bumper device for a vehicle.

Alternatively, or in addition, the bumper reinforcement may include an asymmetrical shape in the up and down direction as shown in FIG. 5 depending on a shape of a bumper cover. For example, an angle of the downward sloping plate member 28 relative to the horizontal line may be larger than an angle of the upward sloping plate member 26 relative to the horizontal line. However, if the bumper reinforcement includes the symmetrical shape, the crash box 11 can evenly be buckled in the up and down direction.

Alternatively, or in addition, more than one reinforcing plate member 31 may be provided.

According to the embodiment of the present invention, the bumper device for a vehicle includes the bumper reinforcement extending along the width direction of the vehicle and formed with the hole at the impact surface. The bumper reinforcement includes at least four ridge lines extending along the width direction of the vehicle at the side of the impact surface.

According to the embodiment of the present invention, even in a condition where the load is applied to the side of the impact surface of the bumper reinforcement at the time of the car crash, because the bumper reinforcement includes at least four ridge lines extending along the width direction of the vehicle at the side of the impact surface, the load can smoothly be transmitted from the impact surface to the other portion of the bumper reinforcement and the stress concentration in the vicinity of the hole at the impact surface can be restrained.

On this occasion, the thickness of a part of the bumper reinforcement located exterior to the hole at the impact surface in the up and down direction may be wider than a part of the bumper reinforcement located within the hole at the impact surface.

According to the embodiment of the present invention, because the bumper reinforcement includes at least four ridge lines extending along the width direction of the vehicle at the side of the impact surface, the load can smoothly be transmitted from the impact surface to the other portion of the bumper reinforcement and the stress concentration in the vicinity of the hole at the impact surface can be restrained. Therefore, the generation of the rupture from the hole formed at the impact surface can be restrained, the energy absorption at the bumper reinforcement can sufficiently be performed, and the energy absorption at the vehicle body side can be restrained. In consequence, the repair cost can be reduced.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle bumper device, comprising:
 a bumper cover;
 a crash box adapted to be connected to a vehicle;
 a bumper reinforcement connected via a mounting plate member to the crash box provided along a width direction of the vehicle between the crash box and the bumper cover, the bumper reinforcement including:
  an impact surface;
  wherein the impact surface comprises a planar upper range portion and a planar lower range portion at respective end regions of the impact surface, the upper range portion and the lower range portion being spaced a first distance away from the vehicle, and an adjacent stepped intermediate range portion in a central region of the impact surface, and having a planar outer end plate member, the planar outer end plate member being spaced a second distance away from the vehicle, the second distance being greater than the adjacent first distance of the upper and lower range portions;
 an upper plate member extending in a vehicle length direction substantially transverse with respect to the mounting plate member;
 a lower plate member extending in the vehicle length direction substantially transverse with respect to the mounting plate member;
 an upward sloping plate extending between the upper range portion of the impact surface and the upper plate member, the upward sloping plate making a first obtuse angle relative to the upper range portion of the impact surface to define a first ridge, the upward sloping plate making a second obtuse angle relative to the upper plate member to define a second ridge, a thickness of the upward sloping plate being greater than a thickness of the upper range portion of the impact surface;
 a downward sloping plate extending between the lower range portion of the impact surface and the lower plate member, the downward sloping plate making a third obtuse angle relative to the lower range portion of the impact surface to define a third ridge, the downward sloping plate making a fourth obtuse angle relative to the lower plate member to define a fourth ridge, a thickness of the downward sloping plate being greater than a thickness of the lower range portion of the impact surface; and
 a reinforcing plate member extending between the central portion of the impact surface and the mounting plate member.

2. The vehicle bumper device according to claim 1, wherein a thickness of a part of the bumper reinforcement located exterior to the hole at the impact surface in an up and down direction thereof is wider than a part of the bumper reinforcement located within the hole at the impact surface in an up and down direction thereof.

3. The vehicle bumper device according to claim 1, wherein the bumper reinforcement includes a mirror symmetrical shape in the up and down direction.

4. The vehicle bumper device according to claim 1, wherein the bumper reinforcement includes an asymmetrical shape in the up and down direction.

* * * * *